United States Patent [19]

Worcester et al.

[11] Patent Number: 5,117,375

[45] Date of Patent: May 26, 1992

[54] CALIBRATION OF MAGNETIC COMPASSES

[75] Inventors: Paul L. A. Worcester; David J. Maxwell, both of Bracknell; Michael L. Trethewey, Guildford, all of United Kingdom

[73] Assignee: British Aerospace Public Company Limited, London, England

[21] Appl. No.: 423,668

[22] Filed: Oct. 19, 1989

Related U.S. Application Data

[63] Continuation of Ser. No. 349,936, May 5, 1989, abandoned, which is a continuation of Ser. No. 902,881, Sep. 2, 1986, abandoned.

[30] Foreign Application Priority Data

Sep. 3, 1985 [GB] United Kingdom ............... 85 21909

[51] Int. Cl.$^5$ .................. G01C 17/38; G06F 15/31
[52] U.S. Cl. .................. 364/571.01; 364/559; 33/356; 324/245
[58] Field of Search .......... 364/434, 453, 559, 571.01, 364/151, 170, 449; 73/1 E, 1 R, 178 R; 33/355 R, 356, 357, 326; 324/202, 244, 245

[56] References Cited

U.S. PATENT DOCUMENTS

| | | | |
|---|---|---|---|
| 4,031,630 | 6/1977 | Fowler | 73/1 E X |
| 4,327,498 | 5/1982 | Setter et al. | 73/178 R X |
| 4,347,730 | 9/1982 | Fisher et al. | 73/1 E |
| 4,351,027 | 9/1982 | Gay et al. | 364/449 X |
| 4,527,231 | 7/1985 | Aucel et al. | 364/151 X |
| 4,539,760 | 9/1985 | Marchent et al. | 33/556 |
| 4,578,747 | 3/1986 | Hideg et al. | 364/151 |
| 4,587,622 | 5/1986 | Herzog | 364/571 X |
| 4,611,293 | 9/1986 | Hatch et al. | 33/356 |
| 4,622,646 | 11/1986 | Waller et al. | 73/1 E X |
| 4,622,843 | 11/1986 | Hormel | 73/1 E |
| 4,672,565 | 6/1987 | Kuno et al. | 33/356 X |
| 4,675,820 | 6/1987 | Smith et al. | 364/571 X |
| 4,686,772 | 8/1987 | Sobel | 33/356 X |
| 4,698,912 | 10/1987 | Fowler et al. | 33/356 |
| 4,710,864 | 12/1987 | Li | 364/151 X |
| 4,797,841 | 1/1989 | Hatch | 33/356 |

FOREIGN PATENT DOCUMENTS

| | | | |
|---|---|---|---|
| 0041892 | 12/1981 | European Pat. Off. | 33/356 |
| 8600129 | 1/1986 | PCT Int'l Appl. | 33/356 |

*Primary Examiner*—Joseph L. Dixon
*Attorney, Agent, or Firm*—Cushman, Darby & Cushman

[57] ABSTRACT

Magnetic compasses may be affected by local disturbances in the magnetic field in their vicinity. These disturbances may be caused by the addition or removal of a metal article concerned with a vehicle in which the compass is mounted, and may also be due to local variations in the Earth's magnetic field. The system described herein compensates for such disturbances in the magnetic field to maintain the accuracy of the magnetic compass by transforming an ellipsoidal locus to a spherical locus at a different orientation in space. For example, a one-shot algorithm is employed in which data collected during a setting maneuver of the vehicle is processed to fit a generalized reduced quadric equation having six or less coefficients rather than the nine calibration points required in the prior art for fitting a generalized quadric equation for an ellipsoid. The present invention thus significantly reduces the processing power required.

8 Claims, 3 Drawing Sheets

CALIBRATION OF MAGNETIC COMPASSES

This is a continuation of application Ser. No. 07/349,936, filed May 5, 1989, which was abandoned upon the filing hereof, and which was a continuation of application Ser. No. 06/902,881 filed Sep. 2, 1986 which is abandoned.

BACKGROUND OF THE INVENTION

This invention relates to the calibration of magnetic compasses to compensate for local disturbance of the magnetic field caused by the structure of the vehicle within which the compass is mounted.

The ideal non-disturbed locus of a vector representing the magnitude of x,y and z signals output by a 3 axis magnetometer is a sphere centered on the origin of the x,y and z axes; however, due to disturbance caused by the ferromagnetic structure of the vehicle carrying the magnetometer, the locus is transformed from a sphere to an ellipsoid offset from the origin of the x,y and z axes. Therefore, in order to take account of the transformation and offset of the locus and thus to obtain compensated x,y and z data it is necessary to apply a compensation which reverts the offset ellipsoid locus to the sphere located at the origin of the body axes.

As a first step in this method, it is necessary to derive data which defines the ellipsoid representing the disturbed field. In published U.K. Application 2,128,749A, for example, the vehicle is moved through a setting routine to obtain 9 calibration points to allow determination of the coefficients of x,y and z in the equation:

$$ax^2 + by^2 + cz^2 + 2fyz + 2gzx + 2hxy + 2ux + 2vy - 2wz = d^2$$

where x is the magnetic field sensed in the x direction
y is the magnetic field sensed in the y direction
z is the magnetic field sensed in the z direction This method involves finding the inverse of a 9×9 matrix and as such requires considerable computing power. In addition, it is found that with some selections of calibration points the above equation does not converge to an ellipsoid but instead fits the points to a non-ellipsoidal shape thus preventing implementation of valid compensation. Also, in U.K. Application 2,128,749A, once the coefficients have been determined they are used to determine the translation needed to bring the ellipsoidal locus to the origin of the x,y and z axes, the amount of rotation to bring the major axis of the ellipsoid into coincidence with the y axis, the amount of scaling of the x,y and z axes to bring the ellipsoid into a sphere, and the amount of rotation to return the sphere back to its original position.

U.S. Pat. No. 4,414,753 also discloses a similar form of magnetic compass calibration.

SUMMARY OF THE INVENTION

According to one aspect of this invention, there is provided a magnetic compass for a vehicle adapted to enable the output of the compass to be compensated by disturbance to the magnetic field caused by the vehicle, and including:

(i) three magnetic sensors responsive to respective nominally orthogonal components of the disturbed magnetic field acting along respective nominally orthogonal body axes of the vehicle for producing signals corresponding to the components;

(ii) data storage means for accumulating data output by the sensors during a setting maneuver of the vehicle;

(iii) data processing means for processing data stored in the data storage means to fit a generalized reduced quadric equation having six or less coefficients and defining an ellipsoid representing the locus of values of the signals and for determining the coefficients;

(iv) calibration means for deriving from the coefficients a calibration function for adjusting values output by the magnetic sensors so that the locus of adjusted values is a spheroid centered on the origin of the body axes, and (v) compensation means for receiving raw data from the magnetic sensors and for implementing the calibration function thereby to obtain signals corresponding to orthogonal components of the magnetic field in which the disturbance has been compensated.

Preferably the data processing means processes data stored in the data storage means to fit a generalized reduced quadric equation of the form:

$$ax^2 + by^2 + \tfrac{1}{2}(a+b)z^2 + 2hxy + 2px + 2qy + 2sz - 1 = 0$$

where x,y and z are values representing the magnetic field in the x,y and z directions, and determine the coefficients a,b,h,p,q and s.

By this arrangement it will be appreciated that the number of coefficients in the equation defining the ellipsoid has been reduced by 3 to 6 as compared with the arrangement disclosed in published Application No. 2,128,749A. This has the clear advantage that computing load is reduced, for in a "one shot" case the solution of the general quadric equation to find the values of the coefficients involves finding the inverse of a 6×6 matrix rather than the inverse of a 9×9 matrix. In addition, further work has shown that in fitting the sampled x,y and z data to the full model having 9 states, it is possible that the coefficient obtained will produce a non-ellipsoid fit. By contrast, with the reduced 6 state model it is found that in all cases the surface generated will be an ellipsoid. Furthermore, there is excellent convergence.

In one arrangement, referred to herein as the "one-shot" algorithm, data from the magnetic sensors is stored during a setting routine at the end of the which the stored data is employed to derive the coefficients a,b,h,p,q and s. In this instance, the data processing means employs a least squares method to fit the x,y,z data to the 6 state quadric equation. This gives rise to an equation of the form $$a = A^{-1} v$$

where
a is a 6×1 vector comprising the coefficients a,b,h,p,q and s;
A is a 6×6 accumulation matrix array containing products of x,y and z data; and
v is a 6×1 accumulation vector containing products of x,y and z data.

According to another aspect of this invention, there is provided a magnetic compass for a vehicle adapted to enable the output of the compass to be compensated for disturbance to the magnetic field caused by the vehicle and for adjusting the compensation to allow for variation in the disturbance and including,
  (i) three magnetic sensors responsive to respective nominally orthogonal components of the disturbed magnetic field acting along respective orthogonal body axes of the vehicle for producing signals corresponding to the components;
  (ii) model coefficient storage means for storing initial values for the coefficients of a generalized quadric equation defining an ellipsoid representing the locus of values of signals x,y and z output by the magnetic sensors;
  (iii) adaptive processing means for receiving and processing continuously data from the sensors to update the coefficients to compensate for variations in the disturbance of the magnetic field;
  (iv) calibration means for deriving from the updated coefficients a,b,h,p,q and s a calibration function for adjusting the values of x,y,z output by the magnetic sensors so that the locus of values of signals x,y and z is transformed into a sphere centered on the origin of the body axes of the vehicle;
  (v) compensation means for receiving raw data from the magnetic sensors and for implementing the calibration function thereby to obtain signals corresponding to orthogonal components of the magnetic field in which the disturbance has been compensated.

According to yet another aspect of this invention, there is provided a magnetic compass for a vehicle adapted to enable the output of the compass to be compensated for disturbance to the magnetic field caused by the vehicle and for adjusting the compensation to allow for variation in the disturbance and including:
  (i) three magnetic forces responsive to respective nominally orthogonal components of the disturbed magnetic field acting along respective body axes of the vehicle for producing signals corresponding to the components;
  (ii) accumulation data storage means for accumulating data output by the sensors;
  (iii) calibration data storage means for storing data representing a matrix relating a vector representing the coefficients to a vector representing the accumulation data contained in the accumulation data storage means; and
  (iv) signal processing means for processing data output by the magnetic sensors and for updating the data stored in the calibration data storage means in accordance therewith to compensate for variations in the disturbance to the magnetic field.

By this arrangement, the variations in disturbance in the magnetic field, due for example to changes in the magnetic signature of the vehicle caused by addition or removal of metal articles, can be compensated, and the speed with which the adaptation is made can be controlled dependent on whether the error is a slow drift or a sudden, discrete change in the magnetic signature of the vehicle. In addition, as the vehicle travels across the earth's surface, the change in the magnetic field may be compensated. Also, an irregular data rate may be used.

BRIEF DESCRIPTION OF THE DRAWINGS

Certain specific embodiments of a magnetic compass will now be described by way of example only, reference being made to the accompanying drawings, in which.

DETAILED DESCRIPTION OF THE PREFERRED EMBODIMENTS

Figure 1:
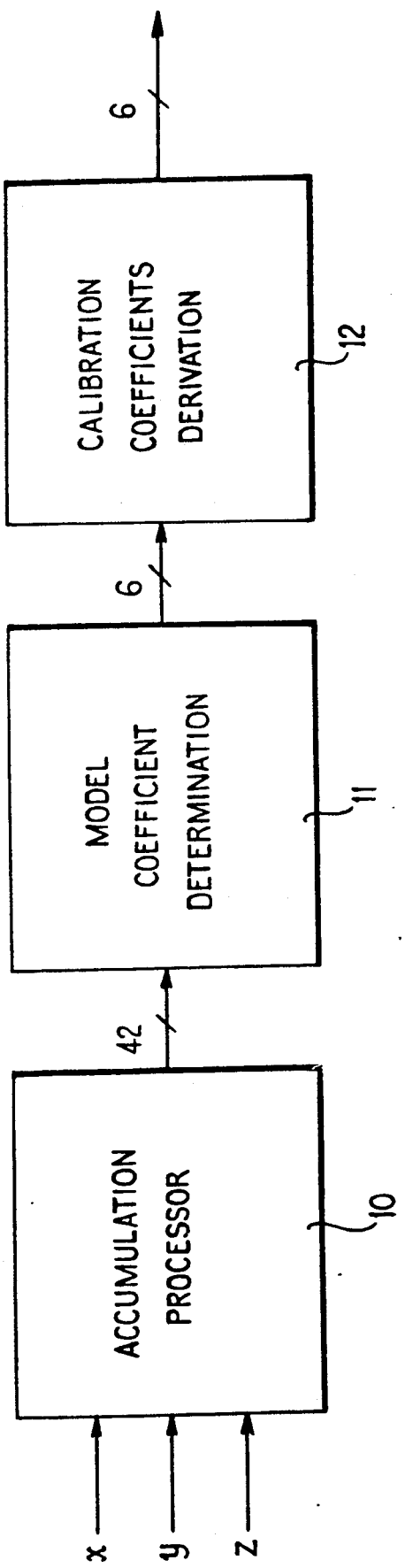
FIG. 1 is a block diagram showing the processes involved in a magnetic compass incorporating a one shot, reduced model algorithm for calibration.

Initial studies were carried out in which a full general quadric equation of the form $$ax^2 + by^2 + cz^2 + 2hxy + 2fxz + 2gyz + 2px + 2qy + 2sz - 1 = 0 \quad \text{(equation I)}$$

was fitted to x,y and z data received from the x,y and z axis magnetometers. The model worked well when adequate excursions were performed during the calibration maneuver, but when such excursions were not available, the model's performance suffered and in particular in the z axis. In fact, in these cases the classical characteristic of parameter unobservability was seen; two z axis parameters 'fighting' each other, grossly mis-identified, yet compensating for each other's error. In many practical applications where the algorithm is required to run continuously, adequate maneuver for a full 3D calibration is unlikely for the majority of the time. In addition, solving the equations to determine the 9 parameters requires substantial computing power and places a high workload on the CPU.

The invention have proposed a reduced form of equation I in which, by constraining the z axis parameters, only 6 unknown parameters are involved. Two constraints are used:

(1) The z axis shape coefficient 'c' is constrained to lie between 'a' and 'b'. A general constraint of this form would give a least square problem tha would be difficult to solve. Instead, a more rigid constraint is applied:

$$c = (a+b)/2$$

(2) The elimination of the modelling of rotations of the ellipsoid z axis about x or y. This is equivalent to setting $$f = g = 0$$

These constraints have the effect of limiting the model's accuracy to soft iron components in the z axis. Hard iron effects are modelled (by coefficient 's'), but the existence of soft iron effects will be absorbed by 's'.

The reduced model now becomes $$ax^2 + by^2 + \tfrac{1}{2}(a+b)z^2 + 2hxy + 2px + 2qy + 2sz - 1 = 0 \quad \text{(equation II)}$$

Applying the least squares fit technique to magnetometer data using this model gives the symmetric system of the form (equation III)

$$\begin{bmatrix} \Sigma\lambda^2 & \Sigma\lambda\mu & 2\Sigma\lambda xy & 2\Sigma\lambda x & 2\Sigma\lambda y & 2\Sigma\lambda z \\ \Sigma\lambda\mu & \Sigma\mu^2 & 2\Sigma\mu xy & 2\Sigma\mu x & 2\Sigma\mu y & 2\Sigma\mu z \\ 2\Sigma\lambda xy & 2\Sigma\mu xy & 4\Sigma x^2y^2 & 4\Sigma x^2y & 4\Sigma xy^2 & 4\Sigma xyz \end{bmatrix} \begin{bmatrix} a \\ b \\ h \end{bmatrix} =$$

-continued $$\begin{bmatrix} 2\Sigma\lambda x & 2\Sigma\mu x & 4\Sigma x^2 y & 4\Sigma x^2 & 4\Sigma xy & 4\Sigma xz \\ 2\Sigma\lambda y & 2\Sigma\mu y & 4\Sigma xy^2 & 4\Sigma xy & 4\Sigma y^2 & 4\Sigma yz \\ 2\Sigma\lambda z & 2\Sigma\mu z & 4\Sigma xyz & 4\Sigma xz & 4\Sigma yz & 4\Sigma z^2 \end{bmatrix} \begin{bmatrix} p \\ q \\ s \end{bmatrix}$$

$$\begin{bmatrix} \Sigma\lambda \\ \Sigma\mu \\ 2\Sigma xy \\ 2\Sigma x \\ 2\Sigma y \\ 2\Sigma z \end{bmatrix}$$

or $$As = v \qquad \text{(equation IV)}$$

In this expression $$\lambda = (x^2 + z^2/2)$$

$$\mu = (y^2 + z^2/2)$$

In equation IV, A is an accumulation matrix comprising products of x,y,z data up to the fourth order; a is a vector of model parameters; and v is an accumulation vector comprising products of x,y,z data up to the second power.

A one shot algorithm is typically solved in this equation by Gaussian elimination—effectively finding the inverse of A.

The benefits of the reduced model are:

(1) A smaller model (6 states), which therefore represents a smaller processor work-load (and memory requirement). This benefit is useful because the difference is significant: work load is proportional to N cubed in some places within the algorithm.

(2) A guarantee of convergence if adequate heading excursions are performed. In the x-y plane the model is as good as a 2D model, and, provided at least half of an orbit is achieved, the x,y parameters will converge to an ellipse. When excursions in the z direction are achieved, the z axis coefficients will begin to 'soak up' z axis errors.

A number of simulation runs have been performed using this model. Figure-of-eight maneuvers and pitch excursions were used in all occasions for regions of varying magnetic dip. Convergence was achieved and the error in the identified parameters in the x-y plane gave rise to small equivalent heading errors. The error in the z axis parameters is heavily dependent on the validity of the assumption that the z axis shape coefficient lies between the x and y axes shape coefficient. With data compatible with this assumption z axis errors are small; data that are not compatible with this assumption give rise to equivalent errors in the identified parameters.

Once the parameters of the reduced model have been determined using the above method, the calibration coefficients—that is, the translation of the ellipsoid to the origin of the x,y and z axes and its transformation into a sphere-are determined. The calibration coefficients are then applied to all subsequent data output by the magnetometers. The determination of the calibration coefficients is discussed in detail below.

Referring to FIG. 1, the compass includes three magnetic sensors aligned with the x,y and z body axes of the vehicle on which the compass is mounted. The sensors supply x,y and z data which is initially processed in accumulation processor 10 to accumulate the x,y and z data—that is, to compute and store the 42 values constituting the A accumulation matrix and the v accumulation vector of equation IV. The values of A and v are then further processed in model coefficient determinator 11 effectively to find the inverse of A so as to find a in the equation $$a = A^{-1}v$$

where a, the vector representing the 6 model coefficients is then used to determine in a calibration coefficient processor 12 the calibration coefficients required to translate and transform the ellipsoidal locus of raw xyz into a spherical locus centered on (0,0,0).

In order to allow the compass quickly to react to changes in magnetic signature or magnetic field, a second embodiment of magnetic compass incorporates an adaptive algorithm which continually updates a previous coefficient vector a.

Equation IV may be re-written in a way that reflects a recursive approach:

$$a_{n+1} = (A_n + \Delta A)^{-1} (v_n - \Delta v) \qquad \text{(equation V)}$$

where $A_n$ and $v_n$ are the accumulation arrays before the n+1th update, and $\Delta A$ and $\Delta v$ are the increments to be made to the accumulators at the n+1th update. It should be noted from inspection of equation III that the increment on the A matrix, $\Delta A$ can be formed from $\Delta v$:

$$A = \Delta v \Delta v^T$$

The matrix inversion lemma can be applied to the inverse to obtain a recursive expression in $A^{-1}$. The result is:

$$a_{n+1} = \left\{ A_n^{-1} - \frac{A_n^{-1} \Delta A A_n^{-1}}{1 + \Delta v^T A_n^{-1} \Delta v} \right\} (v_n + \Delta v)$$

It should be noted that in this expression the denominator term is scalar and we have avoided a matrix inverse; a modification term is added to the previous iteration's calculation of $A^{-1}$ to obtain the new value.

In order to avoid potential problems caused by matrix multiplications and additions, it is proposed to employ a 'UD' (Upper Diagonal) method developed by Bierman known as Bierman's UD update algorithm. The method relies on a factorization of a matrix of the following form:

$$A_n^{-1} = UDU^T$$

where U is upper triangular with unit diagonals and D is a diagonal.

This factorization is only possible if the inverse of A is symmetric; this is so in our case.

With the inverse of A expressed in this form an update algorithm can be produced. It appears to be extremely complicated, but in practice lends itself to computer implementation very well. Such an algorithm has been developed by Bierman, and details may be found in "Factorization Methods for Discrete Sequential Estimation" by G. J. Bierman (Academic Press 1972). The above recursive form requires an initial matrix inverse, $A_o^{-1}$, and vector, $v_o$, to start it off. In general these can be of any value, but the way in which the solution will converge on the true solution will be dependent on these starting conditions. With no additional information, the best starting condition is probably one where $A_o^{-1}$ and $v_o$ are chosen to give the parameter vector a values representing a spheroid. Alternatively, if a one shot calibration can be carried out then the resultant A and v can be used.

This second suggestion is not ideal; it would be undesireable to have both the one shot algorithm and the recursive algorithm in the computer. For this reason the former synthesized initial condition is used.

Since the UD algorithm works on arrays U and D, and not $A^{-1}$, in the implementation $U_o$ and $D_o$ are actually required.

So far the part of the recursive algorithm that computes the inverse of A has been discussed. To complete the process additional computation is necessary. A block diagram of a magnetic compass incorporating a complete recursive algorithm is given in FIG. 2.

Figure 2:
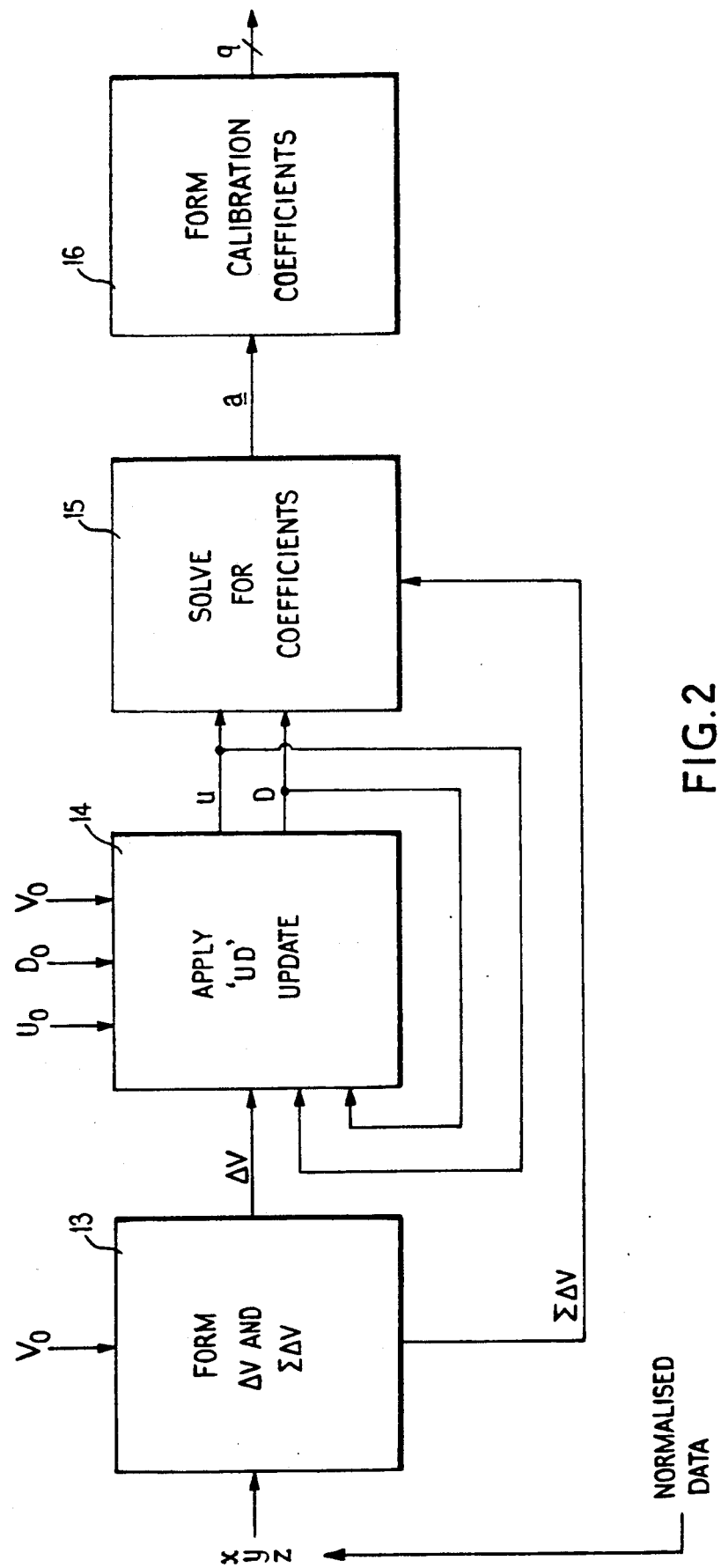
FIG. 2 is a block diagram showing the processes involved in a magnetic compass incorporating an adaptive calibration technique.

FIG. 2 shows the first block 13 where the formulation of v and increments in v takes place. The second block 14 performs the UD update, and the third stage 15 uses the inverse matrix factors, U and D, and the accumulation vector v, to derive the model parameters a. Finally, the parameters are used in block 16 to form the calibration coefficients, details of which will be given later.

The above-defined algorithm has been tested: the tests were aimed at showing the following:

(1) That synthetic initial conditions can be used to start the recursive algorithm.
(2) The recursive algorithm is able to track a changing signature.
(3) That different rates of convergence are possible by selection of the synthetic initial conditions.

The tests were carried out using a figure-of-eight profile with pitch excursions in a north direction, noise of 0.5% in each axis and 600 data points. A number of different runs (different angles of dip and maneuver excursions) were used and on all occasions the recursive algorithm results maintained the correct solution. Variation in the identified calibration coefficients did occur due to noise and maneuver. The magnitude of this variation was less than 0.05% for the x and y coefficients and 0.15% for the z coefficients.

The first test showed the algorithm can track changes in the magnetic signature. New data were then created with different model parameters and these were fed to the algorithm. All the model parameters slowly changed values, converging towards those expected for the new model.

Once a has been found in either of the above methods, the values of a,b,h,p,q and s are used to determine the calibration coefficients which translate and transform the raw x,y, and z data. The origin of the fitted ellipsoid is formed by forming a symmetric matrix:

$$A = \begin{bmatrix} a & h & f & p \\ h & b & g & q \\ f & g & c & s \\ p & q & s & -1 \end{bmatrix}$$

This is reduced to a 3×3 matrix by setting (noting that f=g=0)

$$\begin{bmatrix} x_{OFF} \\ y_{OFF} \\ z_{OFF} \end{bmatrix} = \begin{bmatrix} a & h & 0 \\ h & b & 0 \\ 0 & 0 & c \end{bmatrix}^{-1} \begin{bmatrix} p \\ q \\ s \end{bmatrix}.$$

where $\begin{bmatrix} x_{OFF} \\ y_{OFF} \\ z_{OFF} \end{bmatrix}$ is the offset calibration vector and letting
a′ = a/cc
b′ = b/cc
c′ = c/cc = ½(a+b)/cc
h′ = h/cc where
$cc = 1 - ax_o^2 - cz_o^2 - 2hx_oy_o - 2px_o - 2y_o - 2sz_o$ The deflated matrix is now $$B = \begin{bmatrix} a' & h' & 0 \\ h' & b' & 0 \\ 0 & 0 & c' \end{bmatrix}$$

The calibration coefficients transformation calibration matrix is found by factorizing B to give a diagonal matrix D:

$$L^T B L = D$$

where L is lower triangular.
Then the calibration matrix C is given by $$C = D^{-\frac{1}{2}} L$$

where $D(i,i) = 1/d_{ii}$
Then the magnetic field vector $\hat{H}$ is given by $$\hat{H} = [C] \begin{bmatrix} M_x \\ M_y \\ M_z \end{bmatrix} + \begin{bmatrix} x_{OFF} \\ y_{OFF} \\ z_{OFF} \end{bmatrix}$$

where C is a 3×3 calibration matrix.

$$\begin{bmatrix} M_x \\ M_y \\ M_z \end{bmatrix}$$

is a vector representing the raw magnetic data.
This vector is then adjusted to allow for attitude of the vehicle to obtain a converted vector $\hat{H}_b$:

$$\hat{H}_b = [dcm][\hat{H}]$$

where [dcm] is the directional cosine matrix.
The magnetic heading $\psi$ is then obtained from the equation $$\upsilon = \tan^{-1}\left(\frac{H_b{}^x}{H_b{}^y}\right)$$

A discussion of various modifications to the above two embodiments now follows.

AGE WEIGHTING

In the recursive algorithm, age-weighting is an important consideration. Firstly, the aim for the recursive algorithm is that it may adapt to vehicle magnetic signature changes. Secondly, because it will run continuously, without age-weighting the accumulators will overflow or underflow.

The means by which age-weighting is achieved is straightforward: accumulator data are periodically weighted by a factor less than unity. The choice of value for this factor is dependent on sampling rate and certain operation factors.

If an irregular data is used (as in the case where prolonged straight and level flight data of the vehicle are excluded), it is not possible to deduce a time-constant as such. In this case it is necessary to think of the weighting constant in terms of number of samples accumulated:

$$K = 2^m$$

FAST ADAPTATION

When there is a need for the algorithm to adapt quickly to a change in magnetic signature, the age-weighting mechanism can be used to achieve this. A discrete input to the algorithm is necessary to initiate a weighting.

The actual weight used to perform this function will be more severe than those suggested for continuous age-weighting. The value chosen will determine the degree of authority that is given to historic data compared with subsequent data. For example, if the value of G is chosen to be 0.5 then data collected up to the time of performing the weighting will be given half the authority compared with that given to data collected after the event. This will have the effect of halving the number of samples necessary to counteract those previously collected, thus shortening the time for the algorithm to converge to a new situation. Clearly, weighting factors between say 0.2 and 0.5 are likely to be used. The actual value chosen is dependent on the expected change of magnetic signature when stores are released.

EARTH'S FIELD ESTIMATION

A prerequisite of the recursive algorithm is the ability of being able to estimate the intensity of the earth's magnetic field. Intensity is important, because it effectively defines the 'size' of the ellipsoidal model. Spatial changes that cause intensity changes demand that the model adapts in sympathy. Direction of the earth's magnetic vector does not require identification.

DIRECT ESTIMATES

The principle of direct estimation of the earth's field intensity relies on being able to process calibrated data. These data can be root-sum-squared to find the intensity. This is then used to normalize incoming data, thus compensating for field changes.

The main difficulty with this principle is how to handle the data when initially a full calibration is not available. We propose overcoming this difficulty as follows:

(1) Initially, the calibration process will take place using some arbitrary normalization. In this mode the initial calibration maneuver will take place in a locality.
(2) This is followed by a period of field intensity estimation in the locality.
(3) Stored data are normalized by the newly estimated intensity in a one-shot process.
(4) Recursive calibration continues using current estimates of intensity for normalization.

These four stages require triggering. The first is triggered by a discrete input that initiates the calibration. This must continue until sufficient maneuver has occurred, and when this has occurred the second stage can take place. This stage can be allowed to continue for a predetermined time or a number of samples. At the end of this period the third stage of the one-shot normalization takes place. After this the algorithm operates in its normal running mode.

Figure 3:
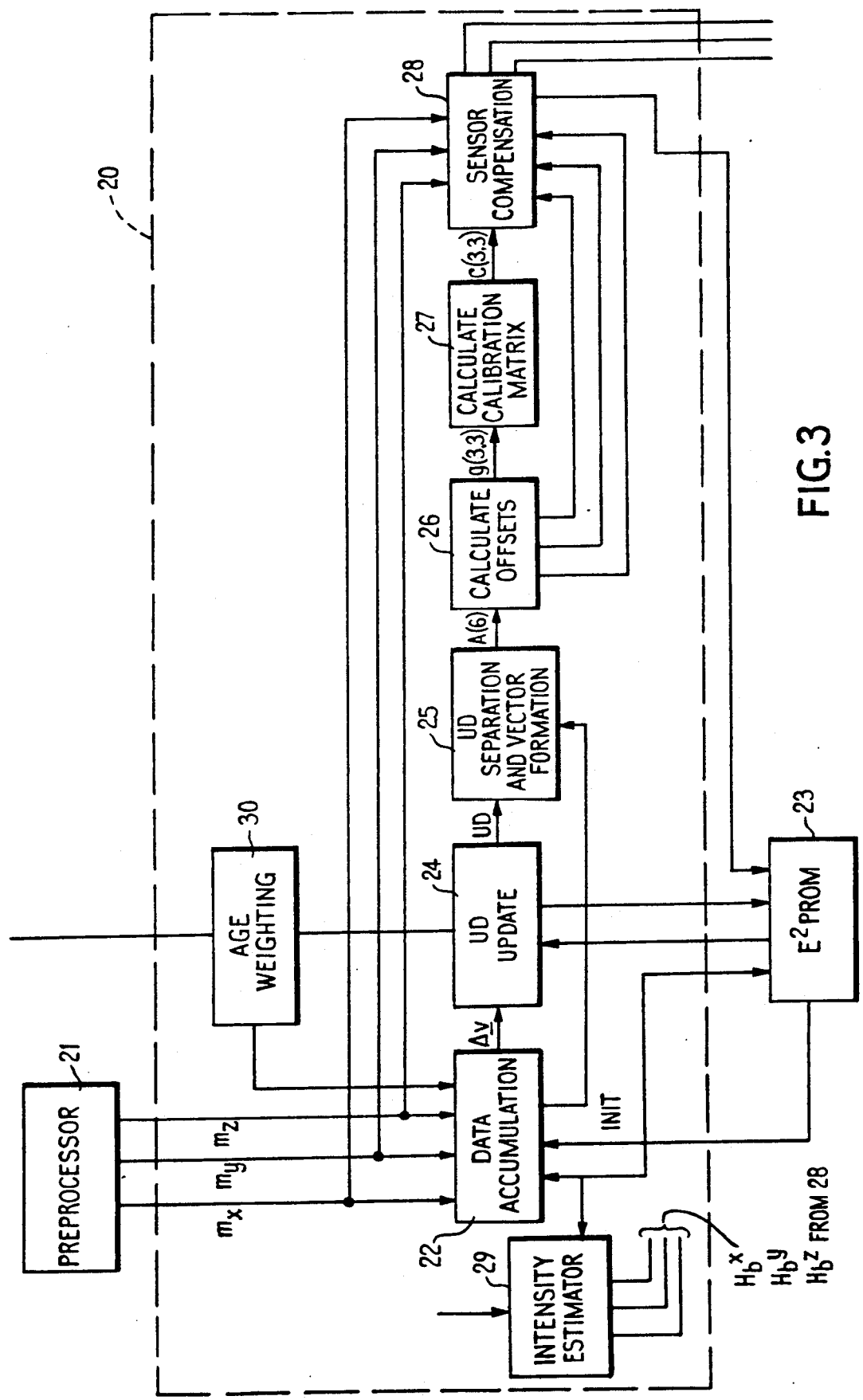
FIG. 3 is a block diagram illustrating an embodiment of the calibration apparatus for a magnetic compass in accordance with the invention.

Referring now to FIG. 3, there is illustrated a specific embodiment of compass calibration device 20. Signals $M_x, M_y$ and $M_z$ from the x,y and z magnetometers are supplied from a pre-processing device 21 to a data accumulation store 22 together with initialization data from an $E^2$ PROM device 23. The data from accumulation store 22 (corresponding to V) is supplied to an UD update processor 24 where the values of v are used to update the UD matrix which is held in the $E^2$ PROM device 23 and which corresponds to $A^{-1}$ mentioned earlier. The UD matrix is then processed at 25 for UD separation and vector formation. The offsets are then calculated at 26 which identify the offset of the center of the ellipsoidal locus from the origin of the x,y and z axes. The calibration matrix is calculated at 27 to determine the shaping matrix which converts the ellipsoidal locus into a spheroid. The offset data and the calibration matrix are applied as raw data to the sensor compensation device 28 to obtain compensated magnetic components $H_b{}^x, H_b{}^y$ and $H_b{}^z$. The calibration matrix and the offsets are also stored in the $E^2$ PROM device 23.

An intensity estimator 29 receiving compensated signals from the sensor compensation is operable in response to a discrete input to estimate the intensity of the magnetic field, and this data may be used thereafter to normalize the incoming data.

Age weighting of the data is effected at 30 in the manner previously described.

We claim:

1. A magnetic compass for a vehicle in which the output of the compass is compensated by disturbance to the magnetic field caused by said vehicle, including:
   three magnetic sensors responsive to respective nominally orthogonal components of the disturbed magnetic field acting along respective nominally orthogonal body axes of the vehicle for producing signals corresponding to said components;
   data storage means for accumulating data output by said sensors during a setting maneuver of the vehicle;
   data processing means for processing data stored in said data storage means to fit a generalized reduced quadric equation having no more than six coefficients and defining an ellipsoid representing the locus of values of said signals and for determining said coefficients;

calibration means for deriving from said coefficients a calibration function for adjusting values output by said magnetic sensors so that said locus of adjusted values is a spheroid centered on the origin of the body axes; and compensation means for receiving raw data from said magnetic sensors and for implementing said calibration function thereby to obtain signals corresponding to orthogonal components of the magnetic field in which said disturbance has been compensated, wherein said data processing means processes data stored in said data storage means to fit a generalized reduced quadric equation of the form:

$$ax^2 + by^2 + \tfrac{1}{2}(a-b)z^2 + 2hxy + 2px + 2qy + 2sz - 1 = 0$$

where x, y and z are values representing the magnetic field in the x, y and z directions, and determine the coefficients a, b, h, p, q and s.

2. A compass according to claim 1, wherein the data from the magnetic sensors is stored during a setting routine at the end of which the stored data is employed to derive the coefficients a,b,h,p,q and s.

3. A compass according to claim 2, wherein the data processing means employs a least squares method to fit the x,y,z data to said reduced quadric equation giving rise to an equation of the form:

$$a = A^{-1}v$$

where a is a 6×1 vector comprising the coefficients a,b,h,p,q and s;

A is a 6×6 accumulation matrix array containing products of x, y and z data; and v is a 6×1 accumulation vector containing products of x,y and z data.

4. A magnetic compass for a vehicle in which an output of the compass is compensated both for disturbance to a magnetic field caused by said vehicle and its load, and for errors of the magnetic compass, said compass comprising:

three magnetic sensors, respectively responsive to nominally orthogonal components of a disturbed magnetic field acting along respective nominally orthogonal body axes of the vehicle, for continuously producing signals corresponding to said orthogonal components; and data processing means, receiving said signals from said three magnetic sensors, for processing said signals to fit, and to continuously determine coefficients a, b, h, p, q and s of a reduced quadric equation of the form:

$$ax^2 + by^2 + \tfrac{1}{2}(a+b)z^2 + 2hxy + 2px + 2qy + 2sz - 1 = 0$$

which define ellipsoids representing a locus of values of said signals, where x, y and z are values representing the magnetic field in the x, y and z directions as the magnetic field changes, said data processing means including means for executing a continuously updated, recursive algorithm, in which an initial matrix inverse and vector are used for initiation purposes, and which derives, from said coefficients, calibration functions for transforming said ellipsoids to a spheroid centered on an origin of said body axes of the vehicle, and compensation means which receives both said signals from said magnetic sensors and said calibration functions from said executing means, for continuously compensating said signals for disturbance to the magnetic field and compensation for any errors of the sensors to produce said output of said compass.

5. A magnetic compass according to claim 4 wherein said data processing means includes means for age weighting said algorithm by providing a factor of a magnitude less than unity, dependant upon sampling rate and operational factors.

6. A magnetic compass according to claim 5 wherein said age weighting factor is utilized to effect adaptation to changes in the sensed magnetic field.

7. A magnetic compass as in claim 4 wherein said recursive algorithm includes means for calculating according to the equation:

$$a_{n+1} = (A_n + \Delta A)^{-1}(V_n + \Delta V)$$

where A is an accumulation matrix comprising products of x, y and z data up to a fourth quarter, a is a vector of model parameters, and v is an accumulation vector comprising products of x, y and z data up to the second power.

8. A method for operating a magnetic compass for a vehicle in which an output of the compass is compensated both for disturbance to a magnetic field caused by said vehicle and its load, and for errors of the magnetic compass, said method comprising the steps of:

providing three magnetic sensors, which are respectively responsive to nominally orthogonal components of a disturbed magnetic field acting along respective nominally orthogonal body axes of the vehicle, and using said sensors for continuously producing signals corresponding to said orthogonal components;

receiving said signals and processing said signals to fit, and to continuously determine coefficients a, b, h, p, q and s of a reduced quadric equation of the form:

$$ax^2 + by^2 + \tfrac{1}{2}(a+b)z^2 + 2hxy + 2px + 2qy + 2sz - 1 = 0$$

which define ellipsoids representing a locus of values of said signals, where x, y and z are values representing the magnetic field in the x, y and z directions as the magnetic field changes, executing a continuously updated, recursive algorithm in which an initial matrix inverse and vector are used for initiation purposes, and which derives, from said coefficients, calibration functions for transforming said ellipsoids to a spheroid centered on an origin of said body axes of the vehicle; and continuously compensating said signals for disturbance to the magnetic field and compensation for any errors of the sensors using both said signals from said magnetic sensors and said calibration functions to produce said output of said compass.

* * * * *